W. H. CRAIG.
SELF FASTENING PLUMB LINE HOLDER.
APPLICATION FILED JAN. 27, 1915.
1,178,056.
Patented Apr. 4, 1916.
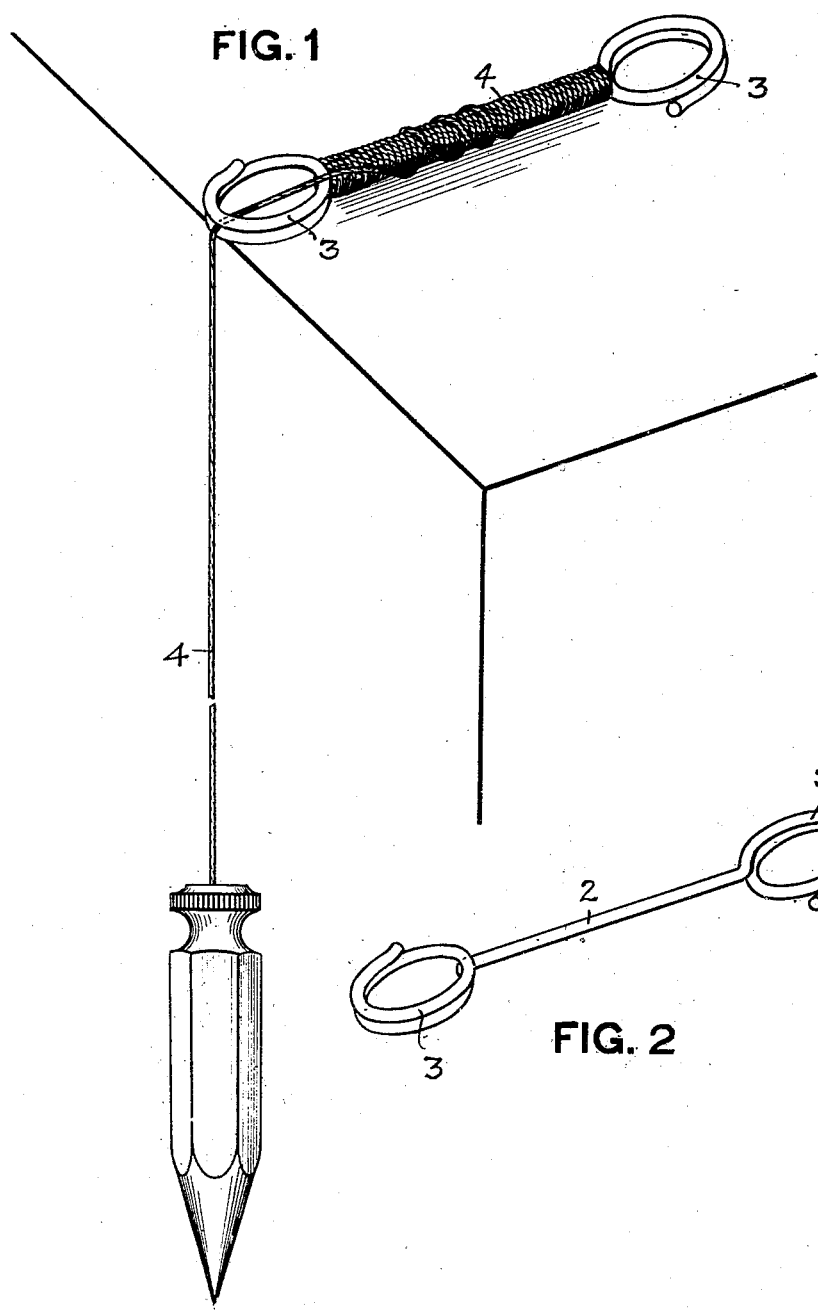
WITNESSES
J. R. Keller
John F. Will
INVENTOR
William H. Craig
By Alfred S. Miller
his Attorney

UNITED STATES PATENT OFFICE.

WILLIAM H. CRAIG, OF CARNEGIE, PENNSYLVANIA.

SELF-FASTENING PLUMB-LINE HOLDER.

1,178,056.  Specification of Letters Patent.  Patented Apr. 4, 1916.

Application filed January 27, 1915. Serial No. 4,766.

*To all whom it may concern:*

Be it known that I, WILLIAM H. CRAIG, a citizen of the United States, residing at Carnegie, in the county of Allegheny and State of Pennsylvania, have invented a new and useful Self-Fastening Plumb-Line Holder, of which the following is a specification.

My invention is a self fastening plumb line holder and the object thereof is to provide a holder for the plumb line which will support the plumb line and bob when in use without fastening. I attain this object by the holder illustrated in the accompanying drawing in which:

Figure 1 shows the holder in use, and Fig. 2 shows the naked holder.

As shown by Fig. 2 the holder is made of steel wire, having a straight winding portion, 2, several inches long and each end thereof having the wire turned into coils, 3, 3, close together. The plumb line 4 is wrapped along the straight portion and to use the holder the line is unwrapped to the desired length and fastened by being drawn through one of the coils and the holder laid down on the top of a wall or other surface with a square edge as shown in Fig. 1. The weight of the holder in this position will support the line and bob without fastening. The coiled ends also provide means whereby the holder may be held against rolling on an uneven surface.

The size of the holder and the number of coils depend upon the length of the line and the weight of the plumb bob. The holder may be made of other material with the coils attached at each end.

I claim:

1. A cord holder formed of wire or the like, comprising a single straight body portion, about which the cord is wound, and closed terminal eye portions integral with the body, and having their bodies disposed in substantially the same plane, and constituting fastening means for the cord.

2. A cord holder formed of wire or the like, comprising a single straight body portion about which the cord is wound, and having terminal eye portions shaped into flat loops of one or more convolutions, said loops lying in substantially the same plane and constituting fastening means for the cord.

3. A cord holder formed of wire or the like, comprising a single straight body portion about which the cord is wound, integral terminal portions shaped into flat loops of one or more convolutions, said loops lying in the same plane with their axis central with the axis of the body portion and constituting spring fastening means for the cord.

WILLIAM H. CRAIG.

Witnesses:
MYRTLE B. HENDERSON,
MATTHEW J. DONALDSON.